United States Patent
Callahan et al.

(10) Patent No.: US 10,458,443 B2
(45) Date of Patent: Oct. 29, 2019

(54) ACTUATOR HAVING AN INTERNAL CONDUCTIVE PATH

(71) Applicant: The Boeing Company, Chicago, IL (US)

(72) Inventors: Kevin S. Callahan, Shoreline, WA (US); Christopher E. Plass, Monroe, WA (US); Matthew A. Moser, Marysville, WA (US)

(73) Assignee: THE BOEING COMPANY, Chicago, IL (US)

( * ) Notice: Subject to any disclaimer, the term of this patent is extended or adjusted under 35 U.S.C. 154(b) by 709 days.

(21) Appl. No.: 15/090,314

(22) Filed: Apr. 4, 2016

(65) Prior Publication Data

US 2017/0284427 A1    Oct. 5, 2017

(51) Int. Cl.
*F15B 15/14*    (2006.01)
*B64C 13/24*    (2006.01)

(52) U.S. Cl.
CPC ...... *F15B 15/1423* (2013.01); *F15B 15/1433* (2013.01); *B64C 13/24* (2013.01); *F15B 2215/305* (2013.01)

(58) Field of Classification Search
CPC ....... B60P 3/2275; B64C 13/24; B64D 45/02; F03D 11/0033; F03D 80/30; F15B 15/1423; F15B 15/1457; F15B 15/1471; F15B 20/00; F15B 2215/305; F15B 15/1433; F16J 7/00
See application file for complete search history.

(56) References Cited

U.S. PATENT DOCUMENTS

| 4,323,003 A | * | 4/1982 | Clippard, III | ........ F16J 15/3268 |
| | | | | 277/346 |
| 5,495,792 A | * | 3/1996 | Izumi | ....................... B62D 5/12 |
| | | | | 92/164 |
| 8,783,735 B2 | | 7/2014 | Kwon et al. | |
| 2007/0057123 A1 | * | 3/2007 | Gahete | .................. B29C 70/345 |
| | | | | 244/123.1 |
| 2014/0352526 A1 | * | 12/2014 | Kusaka | .................... F16J 10/02 |
| | | | | 92/169.3 |

FOREIGN PATENT DOCUMENTS

| CN | 201891696 U | * | 9/2010 |
| GB | 759375 A | * | 10/1956 |

* cited by examiner

*Primary Examiner* — F Daniel Lopez
(74) *Attorney, Agent, or Firm* — Toler Law Group, PC

(57) ABSTRACT

An actuator includes a piston and a housing. The piston includes a piston shaft that is configured to reciprocate within the housing. The actuator also includes a conductor coupled to the piston within the housing and configured to electrically couple the piston to the housing as the piston reciprocates within the housing.

20 Claims, 11 Drawing Sheets

ACTUATOR HAVING AN INTERNAL CONDUCTIVE PATH

FIELD OF THE DISCLOSURE

The present disclosure relates to an actuator having an internal conductive path.

BACKGROUND

Use of composite materials to form components of vehicles has increased as new composite material and manufacturing processes have become available. At the same time, many modern vehicles rely heavily on electronic systems. Composite materials tend not to be very conductive, so grounding of components can be a challenge. For example, when an actuator is coupled to a conductive frame, such as a metal, the conductive frame may provide a conductive path between a piston of the actuator and a cylinder of the actuator. When composite materials are used for the frame, there may be no conductive path between the piston of the actuator and the cylinder of the actuator through the frame. Without a conductive path, an electric potential of the piston and of the cylinder can become unequal.

SUMMARY

In a first aspect of the disclosure, an actuator includes an actuator housing and a piston having a piston shaft. The piston is configured to reciprocate within the housing. The actuator also includes a conductor coupled to the piston within the housing. The conductor is configured to electrically couple the piston to the housing as the piston reciprocates within the housing.

In a second aspect of the disclosure, a structure (such as a vehicle or building) includes an actuator. The actuator includes a housing and a piston having a piston shaft. The piston is configured to reciprocate within the housing. The actuator also includes a conductor coupled to the piston within the housing. The conductor is configured to electrically couple the piston to the housing as the piston reciprocates within the housing.

In a third aspect of the disclosure, a method includes coupling a conductor to a piston such that the conductor is in electrical contact with the piston. The method also includes inserting the conductor and at least a portion of the piston into an actuator housing. Further, the method includes coupling the piston to the actuator housing using a retainer assembly such that the conductor maintains electrical contact with the piston and with the actuator housing during reciprocation of the piston within the housing.

One advantage of the actuator of the present disclosure is that the actuator includes a conductor that provides an electrically conductive contact area to provide a current path between a piston shaft and an actuator housing. The conductor is disposed within the actuator housing and maintains the current path throughout a range of motion of the actuator. Additionally, the features, functions, and advantages that have been described can be achieved independently in various embodiments or may be combined in yet other embodiments, further details of which are disclosed with reference to the following description and drawings.

Each figure shown in this disclosure shows a variation of an aspect of the embodiments presented, and only differences will be discussed in detail.

DETAILED DESCRIPTION

Particular embodiments of the present disclosure are described below with reference to the drawings. In the description, common features are designated by common reference numbers throughout the drawings.

The figures and the following description illustrate specific exemplary embodiments. It will be appreciated that those skilled in the art will be able to devise various arrangements that, although not explicitly described or shown herein, embody the principles described herein and are included within the scope of the claims that follow this description. Furthermore, any examples described herein are intended to aid in understanding the principles of the disclosure and are to be construed as being without limitation. As a result, this disclosure is not limited to the specific embodiments or examples described below, but by the claims and their equivalents.

The present disclosure relates to actuators that include internal features that provide a conductive path between an actuator housing and a piston. For example, the actuator may include a conductor coupled to the piston within the actuator housing. The conductor is configured to electrically couple the piston to the actuator housing as the piston reciprocates within the actuator housing. In some examples, the actuator may include one or more additional components, such as a gland, a guide, a spring element, and a retainer, that are configured to maintain electrical contact between the conductor, the piston shaft, and the actuator housing.

Figure 1:
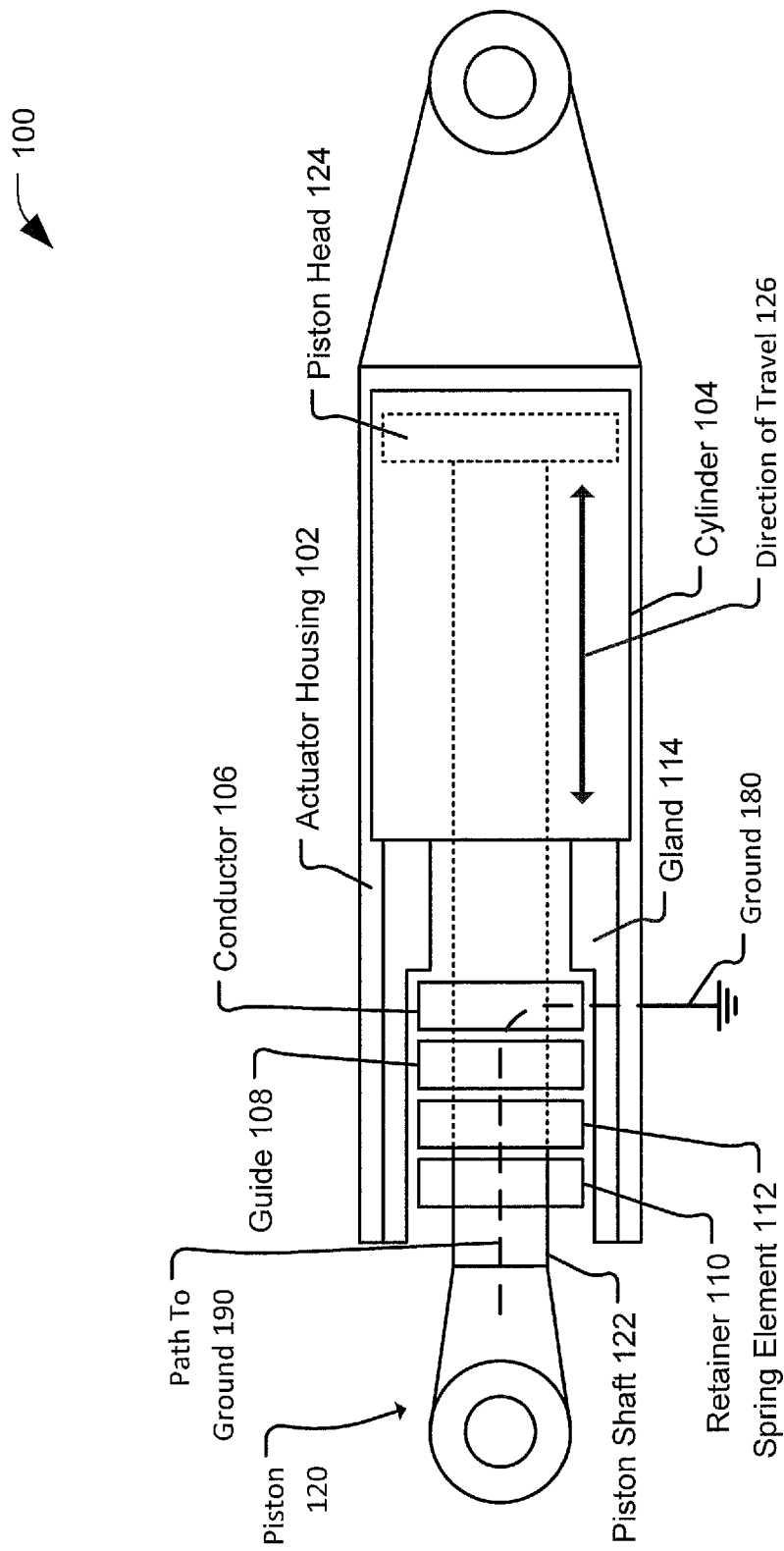
FIG. 1 is a cross-section view of an example of an actuator with internal features that provide a conductive path.

FIG. 1 is a cross-sectional view of an example of an actuator 100 with multiple internal features that provide a conductive path (e.g., a path to ground 190). In use, the actuator 100 may be coupled to a vehicle (not shown). For example, when the vehicle is an aircraft, the aircraft may include one or more wings and a fuselage, which may include a composite structural member, a metallic structural member, or a combination thereof, coupled to the actuator housing. In other examples, the vehicle may include or correspond to a motorcycle, an automobile, a railed vehicle (e.g., a train or tram), a watercraft, another type of aircraft; a spacecraft; or a combination thereof, as illustrative, non-limiting examples. In other examples, the actuator 100 may be coupled to a fixed platform, such as a door, a lifting mechanism, etc.

The actuator 100 includes an actuator housing 102 and a piston 120. The actuator housing 102 defines a cylinder 104 (e.g., a cavity within the actuator housing 102). The actuator housing 102 may include or may be formed of a conductive material. In some uses, the actuator housing 102 may be grounded as indicated in FIG. 1 by a ground symbol 180.

The piston 120 includes a piston shaft 122 and a piston head 124. The piston 120 is configured to reciprocate within the actuator housing 102 as the piston head 124 moves in a direction of travel 126 within the cylinder 104. For example, the piston head 124 may move in the direction of travel 126 due to a pressure of a working fluid of a pneumatic or hydraulic system applied to either side of the piston head 124.

The actuator housing 102 is configured to receive one or more components, such as a gland 114, a conductor 106, a guide 108, a spring element 112, and a retainer 110 in FIG. 1. Each of the components may be coupled to the actuator housing 102 and may surround (e.g., encircle) the piston shaft 122. For example, each of the components may include a central opening (not shown) having an internal diameter that may be greater than or equal to a diameter of the piston shaft 122. The internal diameter of each of the components enables the one or more components to encircle the diameter of the piston shaft 122.

The gland 114 may be coupled to the actuator housing 102 and may surround the piston shaft 122. To illustrate, the piston shaft 122 may extend through a central opening of the gland 114 into the cylinder 104, as explained above. The gland 114 may be electrically coupled to the actuator housing 102. For example, the gland 114 may be in direct physical contact with the actuator housing 102 to provide the conductive path between the gland 114 and the actuator housing 102. The gland 114 may include or be formed of a high wear resistance material, such as aluminum, nickel, bronze, or a combination thereof, as illustrative, non-limiting examples. The gland 114 may include a recess (shown in FIG. 2) configured to receive at least a portion of the conductor 106. The gland 114 may be configured to seal the cylinder 104 to inhibit movement of a pressurized working fluid (e.g., hydraulic fluid) out of the cylinder 104. The gland 114 may include a primary seal, a secondary seal, a buffer seal, bearing elements, wiper/scraper and a static seal, or a combination thereof, as illustrative, non-limiting examples.

The conductor 106 may be coupled to the piston shaft 122 within the actuator housing 102. To illustrate, the piston shaft 122 may extend through a central opening of the conductor 106, as explained above. The conductor 106 may be configured to electrically couple the piston 120 to the actuator housing 102 throughout a range of motion of the piston 120, e.g., as the piston shaft 122 reciprocates within the actuator housing 102. Thus, the conductor 106 may provide a current path between the piston 120 and the actuator housing 102, such as the path to ground 190 from the piston shaft 122 to the actuator housing 102. The conductor 106 may have elastic characteristics such that at least a portion of the conductor 106 (e.g., a contact area) maintains contact with the piston 120 while the piston 120 slides relative to the conductor 106 during reciprocation of the piston 120 within the actuator housing 102. Thus, while the piston shaft 122 moves relative to the actuator housing 102, the conductor 106 maintains contact with both the piston shaft 122 and the actuator housing 102 (e.g., fixed contact with the actuator housing 102 via the gland 114 and sliding contact with the piston shaft 122) to provide the conduction path. In some implementations, the conductor 106 may include a split ring conductor 300 as described within reference to FIG. 3 or a split ring finger conductor 400 as described with reference to FIG. 4.

The guide 108 may be coupled to the piston shaft 122 within the actuator housing 102. To illustrate, the piston shaft 122 may extend through an opening of the guide 108, as explained above. In a particular implementation, the guide 108 includes a first face and a second face. The first face, the second face, or both, may include a recessed area. For example, the recessed area of the first face may be placed in contact with the conductor 106, and the recessed area of the second face may be placed in contact with the spring element 112. The guide 108 may be configured to enable the spring element 112 to distribute an axial force applied by the spring element 112 to the conductor 106. The axial force applied to the conductor 106 may facilitate maintaining contact between the conductor 106 and the gland 114. For example, the axial force may keep at least a portion of the conductor 106 in contact with the gland 114 as the piston shaft 122 reciprocates along the direction of travel 126 within the actuator housing 102. The spring element 112 may be coupled to the piston shaft 122. The piston shaft 122 may extend through an opening of the spring element 112, as explained above. The spring element 112 may include or be formed of an elastomer material, such as silicon, as illustrative, non-limiting example.

The retainer 110 may be coupled to the gland 114 and may surround the piston shaft 122. To illustrate, the piston shaft 122 may extend through an opening of the retainer 110, as explained above. The retainer 110 may be threaded to the gland 114 of a retainer assembly, the retainer assembly including the retainer 110, the spring element 112, the guide 108, the conductor 106, and the gland 114. The retainer assembly may be configured to retain the conductor 106 in electrical contact with the gland 114. In a particular implementation, the retainer 110 may have a recess configured to receive the spring element 112, the guide 108, the conductor 106, at least a portion of the gland 114, or a combination thereof. The threaded portion may be configured to retain the conductor 106 in electrical contact with the gland 114. For example, a portion of the gland 114 may be threaded to receive the retainer 110, the spring element 112, the guide 108 and the conductor 106, as shown in FIG. 1. In this example, the threads of the retainer 110 may be coupled to the threads of the gland 114 to retain the conductor 106, the guide 108 and the spring element 112 within an opening in the gland 114.

During operation, the piston 120 may reciprocate within the actuator housing 102 as the piston head 124 moves in the direction of travel 126 within the cylinder 104. The conductor 106 may be retained in electrical contact with the actuator housing 102 by the elastic characteristics of the conductor 106, the spring element 112, the guide 108, or a combination thereof. Additionally, the conductor 106 slides along the piston shaft 122 as the piston 120 reciprocates. The electrical contact is maintained throughout a full range of motion of the piston 120. Thus, the conductor 106 provides a conductive path (such as the path to ground 190) between the piston 120 and the actuator housing 102. The conductive path may prevent uneven buildup of charge between the piston 120 and the actuator housing 102. Additionally the path to ground 190 may enable dissipation of current due to events, such as a lightning strike.

Figure 2:
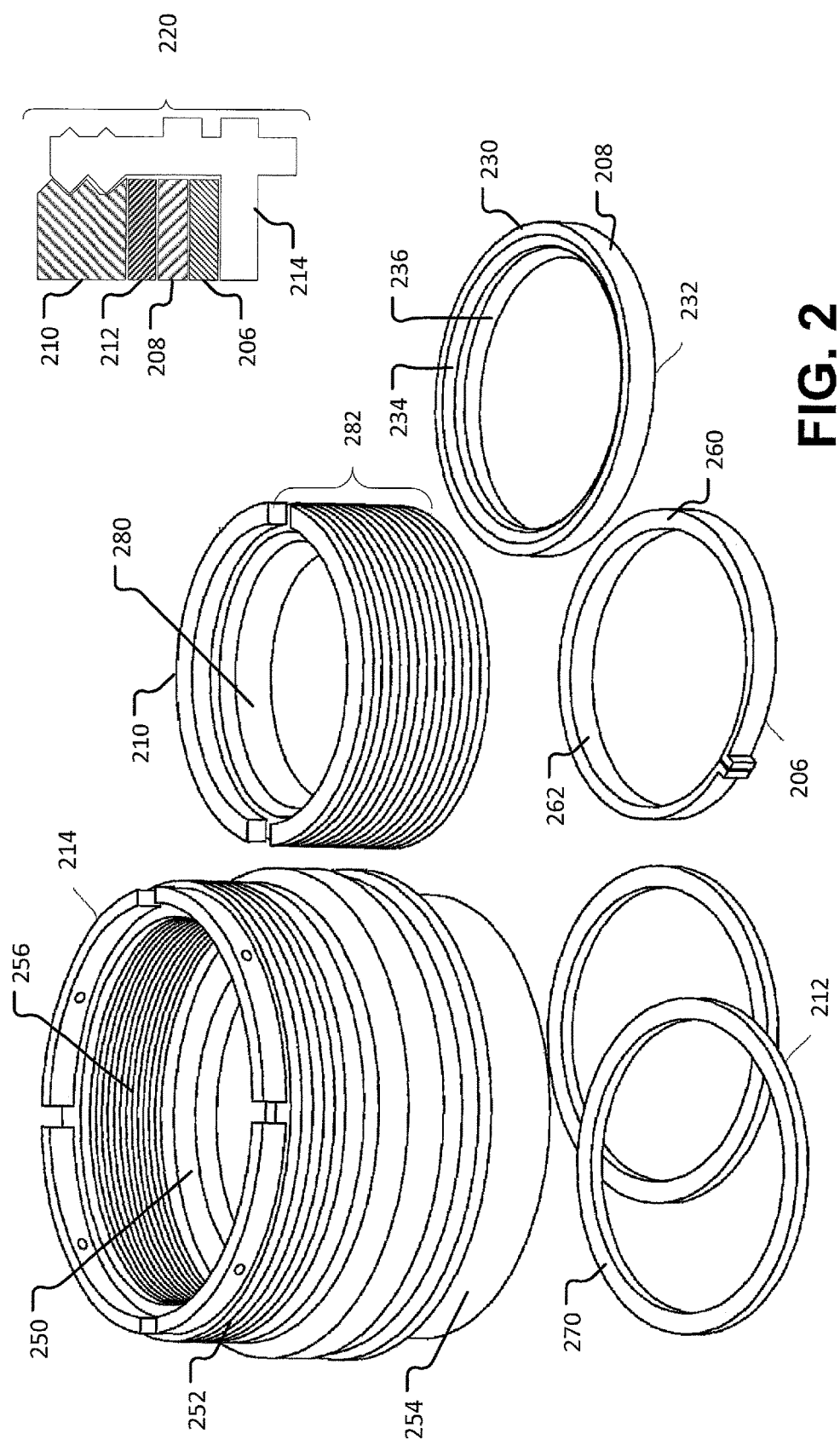
FIG. 2 illustrates internal features of the actuator of FIG. 1.

FIG. 2 illustrates internal features of the actuator 100 of FIG. 1. The internal features illustrated in FIG. 2 include a gland 214, a conductor 206, a guide 208, a spring element 212, and a retainer 210.

The gland 214 may correspond to the gland 114 of FIG. 1. The gland 214, as described with reference to FIG. 1, may be coupled to the actuator housing 102 and may surround the piston shaft 122. The gland 214 may include an inner portion 256 that includes threading. The threading of the inner portion 256 may be configured to receive at least a portion of the retainer 210. The gland 214 may also include an outer portion 252 that includes threading. The threading of the outer portion 252 may be configured to couple the gland 214 to an actuator housing. The gland 214 may include a recess. The recess, as illustrated by section 220, may be configured to receive at least a portion of the conductor 206, the guide 208, the spring element 212, the retainer 210, or a combination thereof. The gland 214 may include a bottom portion 254 that is retained in direct physical contact with the actuator housing 102. The bottom portion, the outer portion 252, or both may provide a conductive path between the gland 214 and the actuator housing 102. In some implementations, the bottom portion 254 may be configured to seal the cylinder 104 to inhibit movement of a pressurized working fluid (e.g., hydraulic fluid) past an interface between the actuator housing 102 and the cylinder 104. The bottom portion 254 may include a primary seal, a secondary seal, a buffer seal, bearing elements, wiper/scraper and a static seal, or a combination thereof, as illustrative, non-limiting examples.

The conductor 206 may correspond to the conductor 106 of FIG. 1. The conductor 206, as described with reference to FIG. 1, may be coupled to the piston shaft 122 within the actuator housing 102, as explained above. The conductor 206 may be configured to electrically couple the piston 120 to the actuator housing 102 (via a first contact area 260 and a second contact area 262) throughout a range of motion of the piston 120, e.g., as the piston shaft 122 reciprocates within the actuator housing 102. Thus, the conductor 206 may provide a current path between the piston 120 and the actuator housing 102. The conductor 206 may have elastic characteristics, such that at least a portion of the second contact area 262 maintains contact with the piston 120 and at least a portion of first contact area 260 maintains contact with the gland 214, while the piston 120 slides relative to the conductor 206 during reciprocation of the piston 120 within the actuator housing 102. While the piston shaft 122 moves relative to the actuator housing 102, the second contact area 262 slides along the piston shaft 122 and maintains electrical contact with the piston shaft 122. Additionally, the first contact area 260 remains in relatively static contact with the gland 214. In some implementations, the conductor 206 may include a split ring as described within reference to FIG. 3.

The guide 208 may correspond to the guide 108 of FIG. 1. The guide 208, as described with reference to FIG. 1, may be coupled to the piston shaft 122 within the actuator housing 102. In a particular implementation, the guide 208 includes a first face 230 and a second face 232. The first face 230, the second face 232, or both, may include a recessed area 234, 236. For example, the recessed area 234 of the first face 230 may be placed in contact with the conductor 206, and the recessed area 236 of the second face 232 may be placed in contact with the spring element 212. The guide 208 may be configured to enable the spring element 212 to apply a substantially uniform force to the conductor 206. The substantially uniform force applied to the conductor 206 may facilitate maintaining contact between the conductor 206 and the gland 214. For example, the substantially uniform force may keep at least a portion of the first contact area 260 of the conductor 206 in contact with the gland 214, as the piston shaft 122 reciprocates along the direction of travel 126 within the actuator housing 102. The spring element 212 may correspond to the spring element 112. The spring element 212 may be coupled to the piston shaft 122, as explained above. The spring element 212 may include a first face 270. The first face 270 of the spring element 212 may be configured to apply a force to the recessed area 236 of the second face 232 of the guide 208 to facilitate maintaining contact between the conductor 206 and the gland 214.

The retainer 210 may correspond to the retainer 110 of FIG. 1. The retainer 210, as described with reference to FIG. 1, may be coupled to the gland 214 and may surround the piston shaft 122. The retainer 210 may include an inner portion 280 configured to receive a retainer assembly, including the spring element 212, the guide 208, the conductor 206, or a combination thereof. The retainer assembly may be configured to retain the conductor 206 in electrical contact with the gland 214. The retainer 210 may include an outer portion 282 that includes threading. The threaded outer portion 282 may be configured to receive and couple to the threading of the inner portion 256 of the gland 214. In operation, the threaded outer portion 282 may be configured to retain the conductor 206 in electrical contact with the gland 214.

Although FIGS. 1 and 2 illustrate the retainer 210 and the gland 214 configured such that the retainer 210 is retained within an opening of the gland 214, in other examples, a portion of the gland 214 may be received within an opening of the retainer 210. For example, the inner portion 280 of the retainer 210 may include threading. In this example, at least a portion of the outer portion 252 of the gland 214 may include threading configured to couple to the threading of the inner portion 280. In yet another example, the actuator housing may be configured to receive the gland 214 and the retainer 210 and another mechanism may be used to both retain the gland 214 in contact with the actuator housing and to retain the retainer 210 in contact with the gland 214 or the actuator housing.

Figure 3:
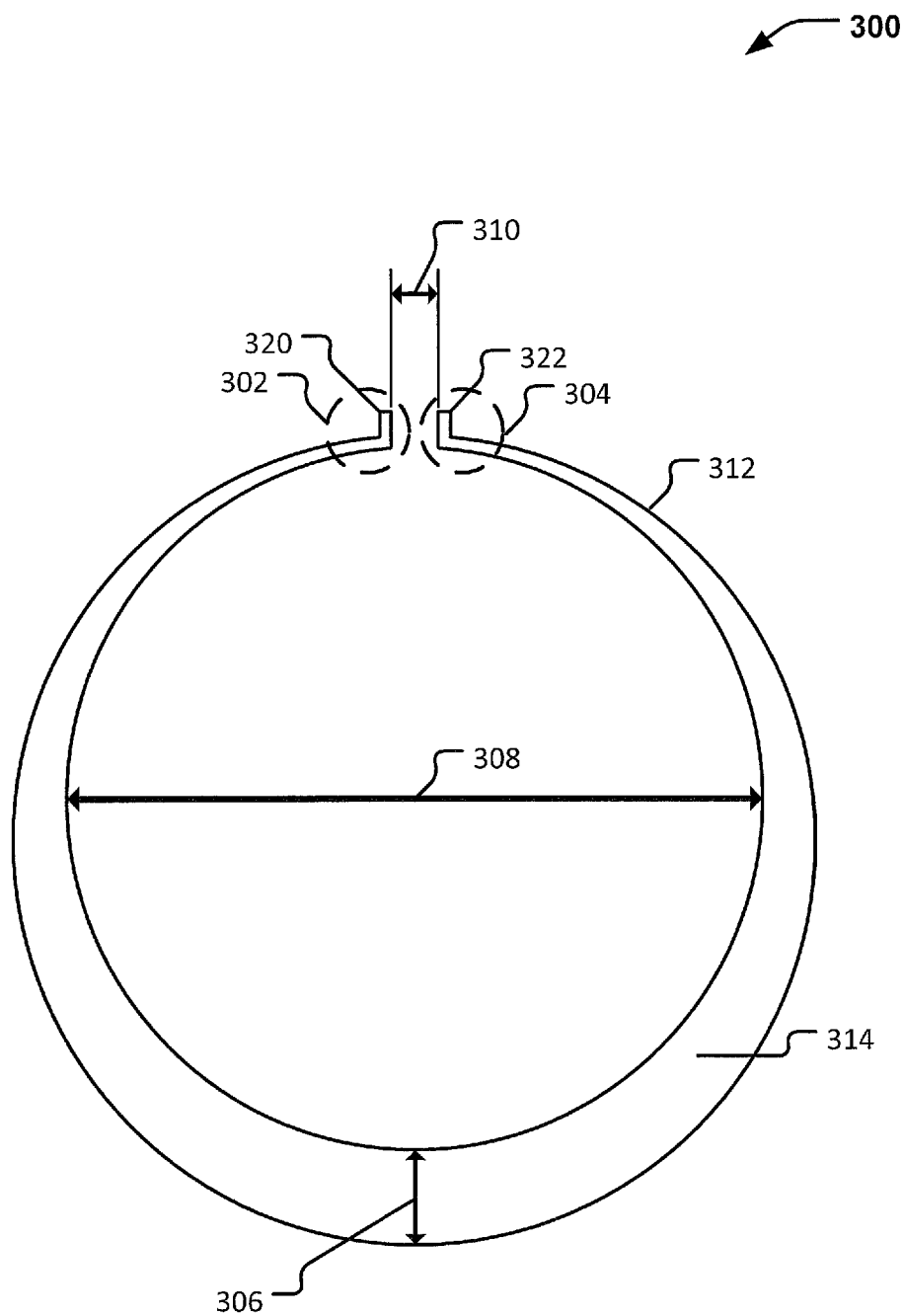
FIG. 3 illustrates an example of a split ring conductor.

FIG. 3 illustrates an example of a split ring conductor 300. The split ring conductor 300 may correspond to the conductor 106 of FIG. 1 or the conductor 206 of FIG. 2. The split ring conductor 300 includes a curved body 312 having a first end 302 and a second end 304.

The curved body 312 may be formed of or include a conductive material. For example, the curved body 312 may be formed or include of a conductive metal. Additionally, the conductive material may be flexible to enable the curved body 312 to elastically deform, e.g., to fit tightly around the piston shaft. To illustrate, the curved body 312 defines a central opening 308 configured to receive the piston shaft. The central opening 308 may have a diameter that is less than a diameter of the piston shaft. The first end 302 and the second end 304 are separated by a gap 310. The gap 310 has a first dimension (e.g., distance between the first end 302 and the second end 304) when the curved body 312 is in a neutral or un-flexed position. When the curved body 312 is placed around the piston shaft, since the diameter of the central opening 308 is less than the diameter of the piston shaft, the gap 310 may increase due to flexing of the curved body 312.

Further, the curved body 312 is shaped such that a thickness 306 of the curved body 312 is greater (e.g., thicker) in a region between the first end 302 and the second end 304 than a thickness at the first end 302 and the second end 304. Stated another way, the curved body 312 tapers toward each end 302, 304. The tapering thickness enables the curved body 312 to apply relatively even pressure around a circumference of the piston shaft. In another example, the thickness of the curved body 312 is uniform between the first end 302 and the second end 304.

The split ring conductor 300 includes a first elongated member 320 coupled to the first end 302 and extending radially from the curved body 312. The split ring conductor 300 also includes a second elongated member 322 coupled to the second end 304 and extending radially from the curved body 312. In some implementations, the first end 302, the second end 304, or both, may enable application of a relatively uniform axial force (e.g., a force in a direction corresponding to an axis of the piston shaft) to the split ring conductor 300. For example, as described with reference to FIG. 1, the split ring conductor 300 may be coupled to the gland by a retainer assembly that includes a retainer, a spring element, and a guide. In this example, a front face 314 of the curved body 312 may contact the gland (e.g., the gland 114 of FIG. 1), and a back face (not shown in the perspective illustrated in FIG. 3) of the split ring conductor 300 may contact the guide. In this example, the spring element is configured to press against (e.g., apply a force in the axial direction to) the retainer and to press against (e.g., apply a force in the axial direction to) the guide. Further, in this example, the guide is configured to press against (e.g., apply a force in the axial direction to) the split ring conductor 300. The first elongated member 320 and the second elongated member 322 provide surfaces near the first and second ends 302, 304, respectively, to receive the force applied by the guide. Thus, rather than the guide pressing unevenly on the split ring conductor 300 (due to the much greater surface area of the thicker region of the curved body relative to the ends 302, 304), the elongated members 320, 322 enable the guide to apply a relatively uniform axial force to the split ring conductor 300.

Figure 4:
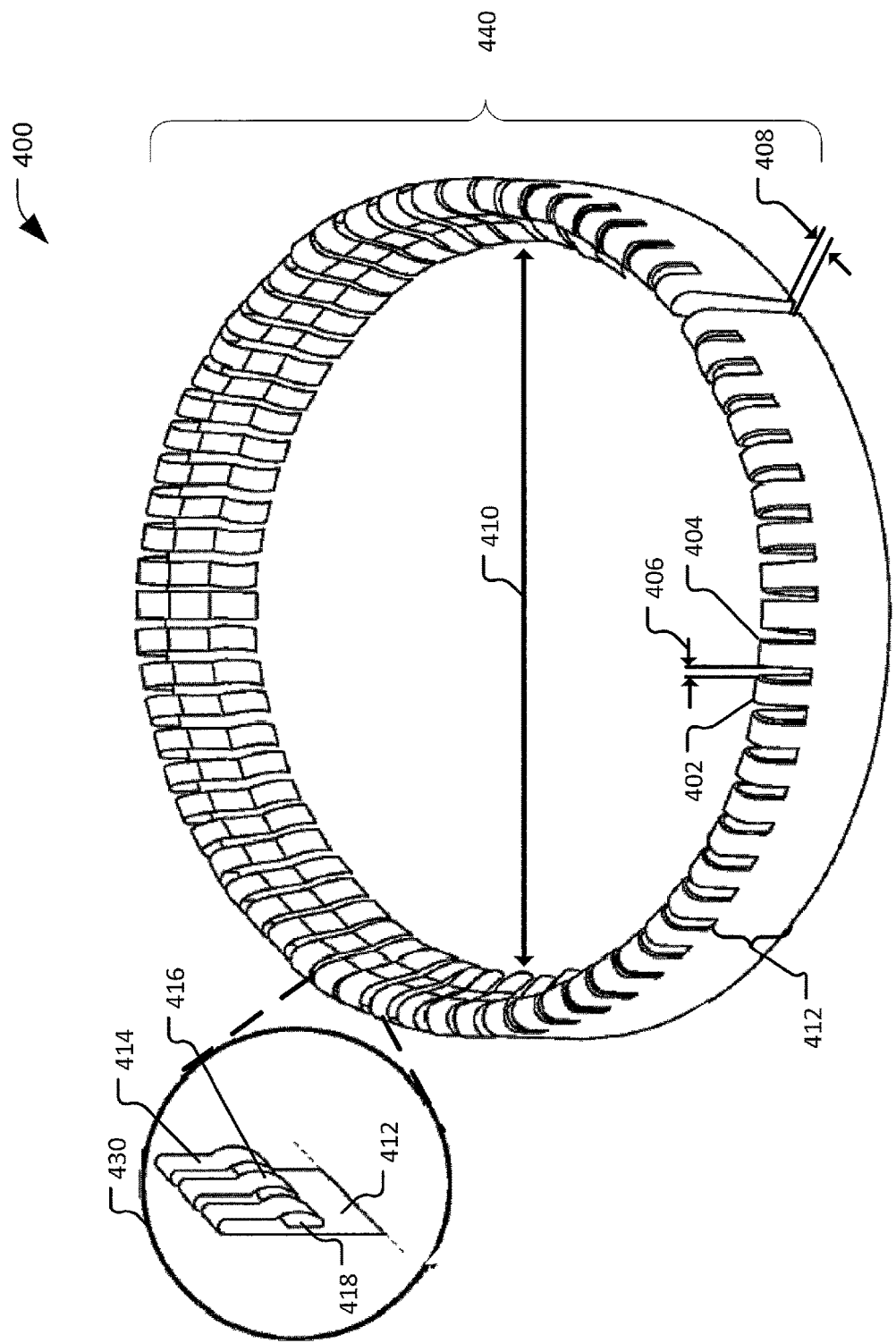
FIG. 4 illustrates an example of a split ring finger conductor

FIG. 4 illustrates an example of a split ring finger conductor 400. The split ring finger conductor 400 may correspond to the conductor 106 of FIG. 1 or the conductor 206 of FIG. 2.

The split ring finger conductor 400 includes a curved body 440 having a first end and a second end separated by a gap 408. The curved body 440 may be formed of or include a conductive material. For example, the curved body 440 may be formed or include of a conductive metal. Additionally, the conductive material may be flexible to enable the curved body 440 to elastically deform, e.g., to fit tightly around the piston shaft.

To illustrate, in FIG. 4, the curved body 440 defines a central opening 410 configured to receive the piston shaft. The central opening 410 may have a diameter that is less than a diameter of the piston shaft. The gap 408 has a first dimension (e.g., a distance between the first end and the second end) when the curved body 440 is in a neutral or un-flexed position. When the curved body 440 is placed around the piston shaft, since the diameter of the central opening 410 is less than the diameter of the piston shaft, the gap 408 may increase due to flexing of the curved body 440.

The curved body 440 also includes a plurality of spring fingers, such as a first spring finger 402 and a second spring finger 404. A recess or notch separates each pair of adjacent spring fingers. For example, a recess 406 is between the first spring finger 402 and the second spring finger 404. The fingers are coupled to a non-finger portion 412 of the curved body 440 (e.g., a ring of material below the fingers in the view illustrated in FIG. 4). In a particular embodiment, the spring fingers and the curved body 440 are formed as a single piece. For example, a metal sheet may be cut to a length corresponding to a circumference of the curved body 440. Recesses may be cut, stamped, or otherwise formed in the sheet to define finger regions and the non-fingered portion. The finger regions may be bent, as illustrated in callout 430 of FIG. 4, to form the spring fingers. Subsequently, the sheet, including the spring fingers, may be bent to form the curved body 440.

In FIG. 4, each spring finger includes a primary spring portion 414, a contact portion 416 and a backing spring portion 418 coupled to the non-fingered portion 412 of the curved body 440. The primary spring portion 414 and the backing spring portion 418 may flex to enable the contact portion 416 to remain in contact with and apply a pressure against the piston shaft. The primary spring portion 414 and the backing spring portion 418 provide conductive paths between the contact portion 416 and the non-fingered portion 412. The non-fingered portion 412, and potentially backs of one or more of the fingers, may contact the gland or portions of a retaining assembly to provide a conductive path between the piston shaft and the gland. The contact portions 416 slide along the piston shaft as the piston reciprocates within the actuator housing.

Figure 5:
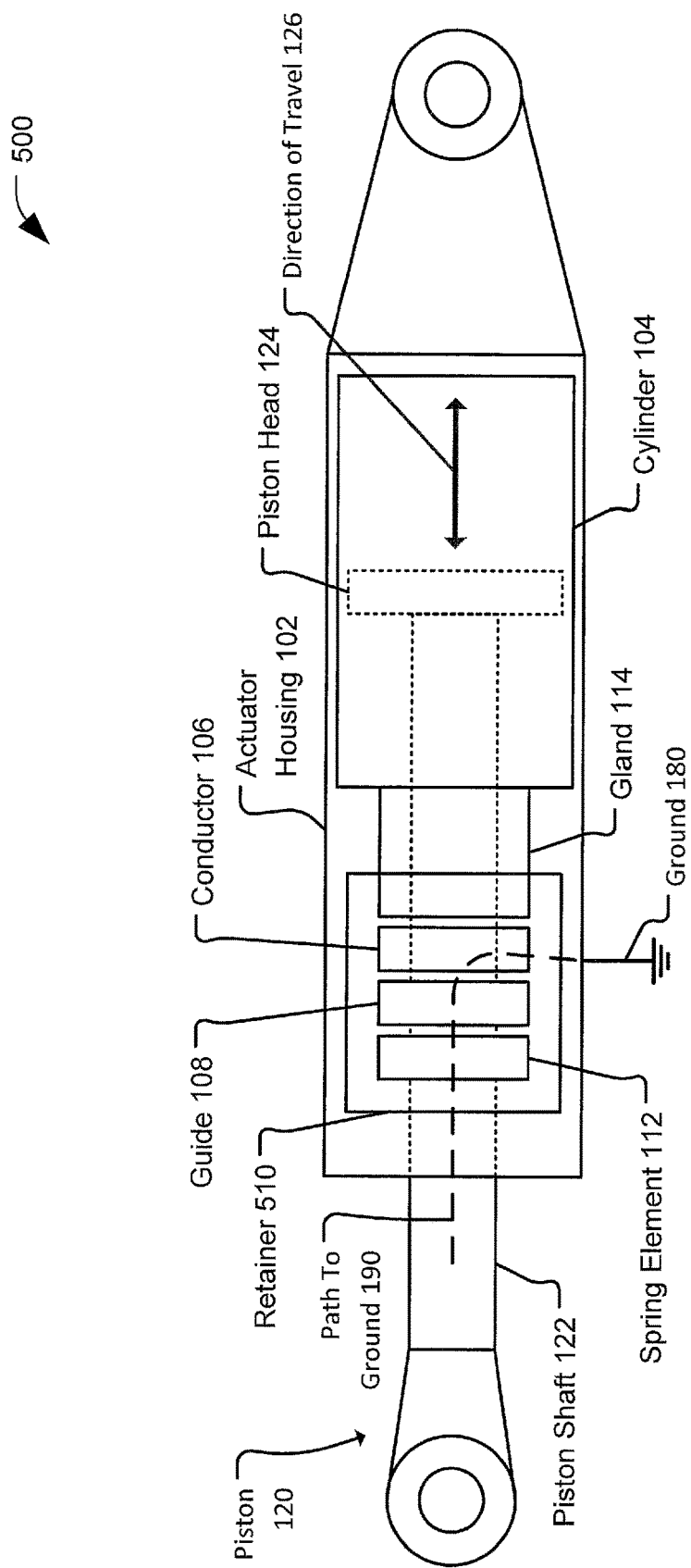
FIG. 5 is a cross-sectional view of another example of an actuator with internal features that provide a conductive path.

FIG. 5 is a cross-sectional view of another example of an actuator 500 with multiple internal features that provide a conductive path (e.g., a path to ground 190). In some implementations, the actuator 500 of FIG. 5 includes the actuator housing 102, the cylinder 104, the piston 120, the piston shaft 122, the piston head 124, the gland 114, the conductor 106, the guide 108, the spring element 112, and the path to ground 190 of FIG. 1. The actuator 500 further includes the retainer 510.

The retainer 510 may correspond to the retainer 110 of FIG. 1. The retainer 510 may be coupled to the gland 114 and may surround the piston shaft 122. To illustrate, the piston shaft 122 may extend through an opening of the retainer 510, as explained above. The retainer 510 may be configured to connect to the gland 114 of a retainer assembly, the retainer assembly including the retainer 510, the spring element 112, the guide 108, the conductor 106, and the gland 114. The retainer assembly may be configured to retain the conductor 106 in electrical contact with the gland 114. The retainer 510 may include a threaded portion adjacent to the recess. The threaded portion may be configured to couple the retainer 510 to at least a portion of the gland 114 to retain the conductor 106 in electrical contact with the gland 114

Figure 6A:
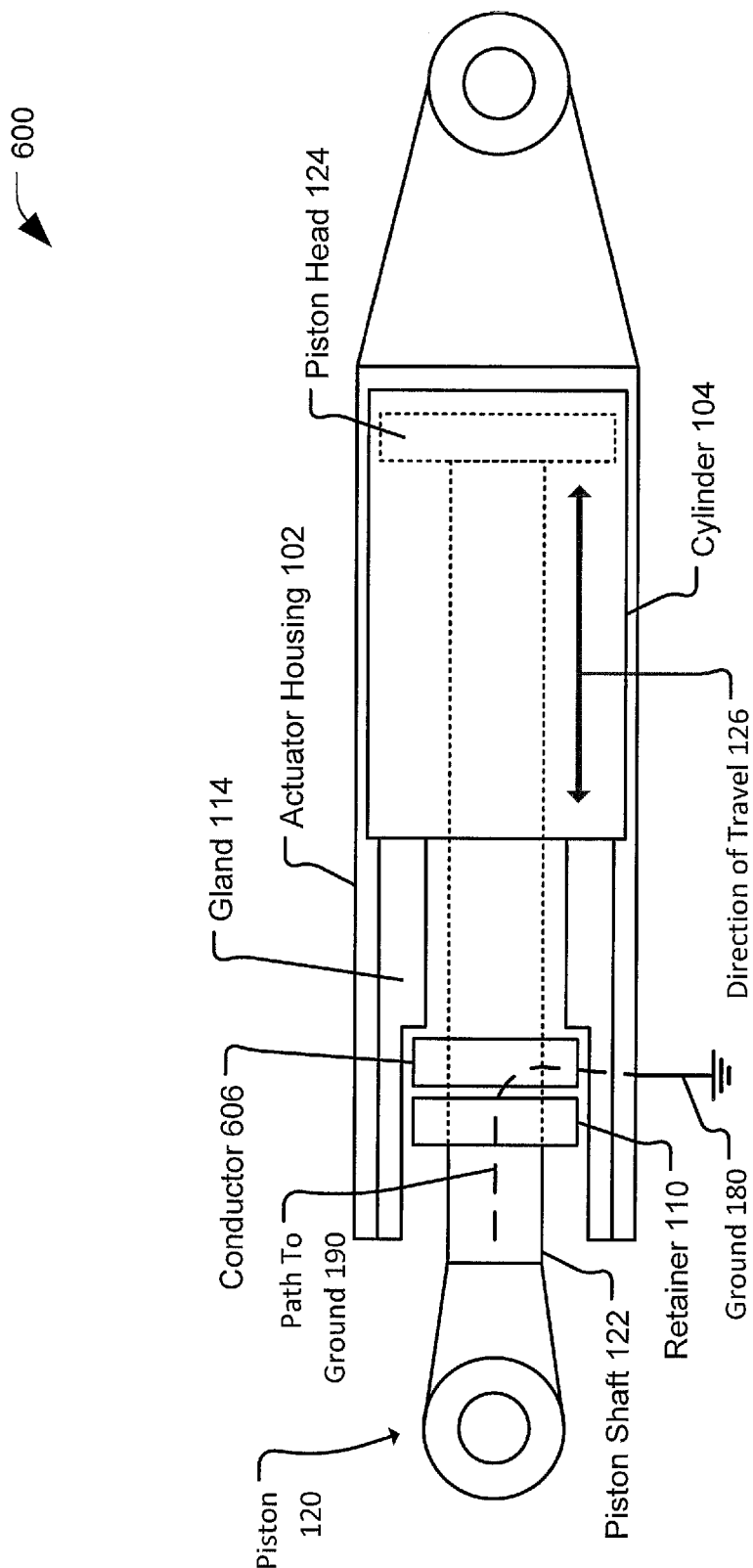
FIG. 6A is a cross-sectional view of another example of an actuator with internal features that provide a conductive path.

FIG. 6A is a cross-sectional view of another example of the actuator 600 with multiple internal features that provide a conductive path (e.g., a path to ground 190). In some implementations, the actuator 600 of FIG. 6 includes the actuator housing 102, the cylinder 104, the piston 120, the piston shaft 122, the piston head 124, the gland 114, the retainer 110, and the path to ground 190 of FIG. 1. The actuator 600 further includes the conductor 606.

The conductor 606 may correspond to the conductor 106 of FIG. 1. In FIG. 6, the conductor 606 includes a split ring finger conductor, such as the split ring finger conductor 400 of FIG. 4. The conductor 606 includes a plurality of fingers that are disposed circumferentially around the conductor 606. The spring portion may be configured to enable the contact portion to remain in contact with the piston shaft 122 and to apply a pressure against the piston shaft 122, while the piston shaft 122 reciprocates within the actuator housing 102. The contact of the contact portion to the piston shaft 122 provides an electrically conductive path (e.g., the path to ground 190) between the piston shaft 122 and the actuator housing 102 to safely pass a current from the piston shaft 122 to the actuator housing 102.

Figure 6B:
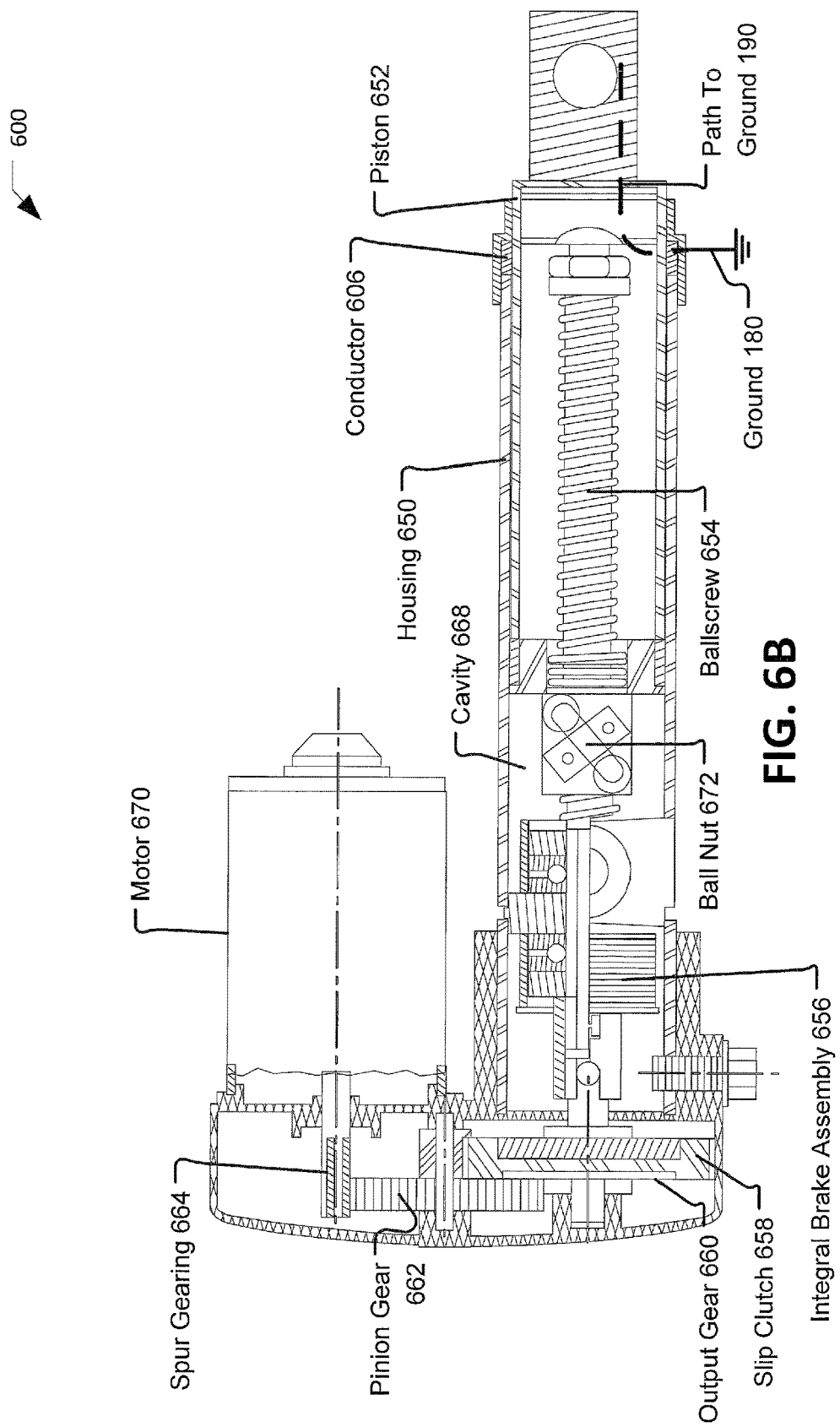
FIG. 6B is a cross-sectional view of another example of an actuator with internal features that provide a conductive path.

FIG. 6B is a cross-sectional view of another example of the actuator 600 with multiple internal features that provide a conductive path (e.g., a path to ground 190). In some implementations, the actuator 600 of FIG. 6 includes a housing 650, a piston 652, a ball nut 672, a ballscrew 654, an integral brake assembly 656, a slip clutch 658, an output gear 660, a pinion gear 662, a spur gearing 664, a motor 670, and the conductor 606.

In the implementation illustrated in FIG. 6B, the motor 670 may be configured to control operations (e.g., movement) of the actuator 600. The motor 670 is coupled to the spur gearing 664. The spur gearing 664 is coupled to the pinion gear 662. For example, the spur gearing 664 may include a first structure and the pinion gear 662 may include a second structure. The first structure and the second structure may include teeth configured to interlock the spur gearing 664 and the pinion gear 662 and transmit rotational motion (e.g., torque).

The pinion gear 662 is coupled to the output gear 660. For example, the pinion gear 662 may be known as an "input gear" or drive gear that provides rotational motion to the output gear 660 (e.g., the gear that is being turned). The output gear 660 is coupled to the slip clutch 658. The slip clutch 658 is configured to limit torque by slipping. The slip clutch 658 may be coupled to a drive shaft (not shown) and the drive shaft may be coupled to the integral brake assembly 656 and to the ballscrew 654. The ballscrew 654 may be positioned within a cavity 668 defined by the housing 650. The ballscrew 654 is coupled to the ball nut 672. Rotation of the ballscrew 654 provides translational motion of the ball nut 672. The ball nut 672 is coupled to the piston 652. The housing 650 may correspond to the actuator housing 102 of FIG. 1.

The housing 650 may include the piston 652 and the conductor 606. The conductor 606 may correspond to the conductor 106 of FIG. 1. In FIG. 6, the conductor 606 may include a split ring conductor, such as the split ring conductor 300 of FIG. 3. In another example the conductor 606 may include a split ring finger conductor, such as the split ring finger conductor 400 of FIG. 4. The conductor 606 is configured to slide along the piston 652 as the piston 652 moves within a cavity 668. Electrical contact is maintained throughout a full range of motion of the piston 652. Thus, the conductor 606 provides a conductive path (such as the path to ground 190) between piston 652 and the housing 650. The conductive path may prevent uneven buildup of charge between piston 652 and the housing 650. Additionally the path to ground 190 may enable dissipation of current due to events, such as a lightning strike.

Figure 7A:
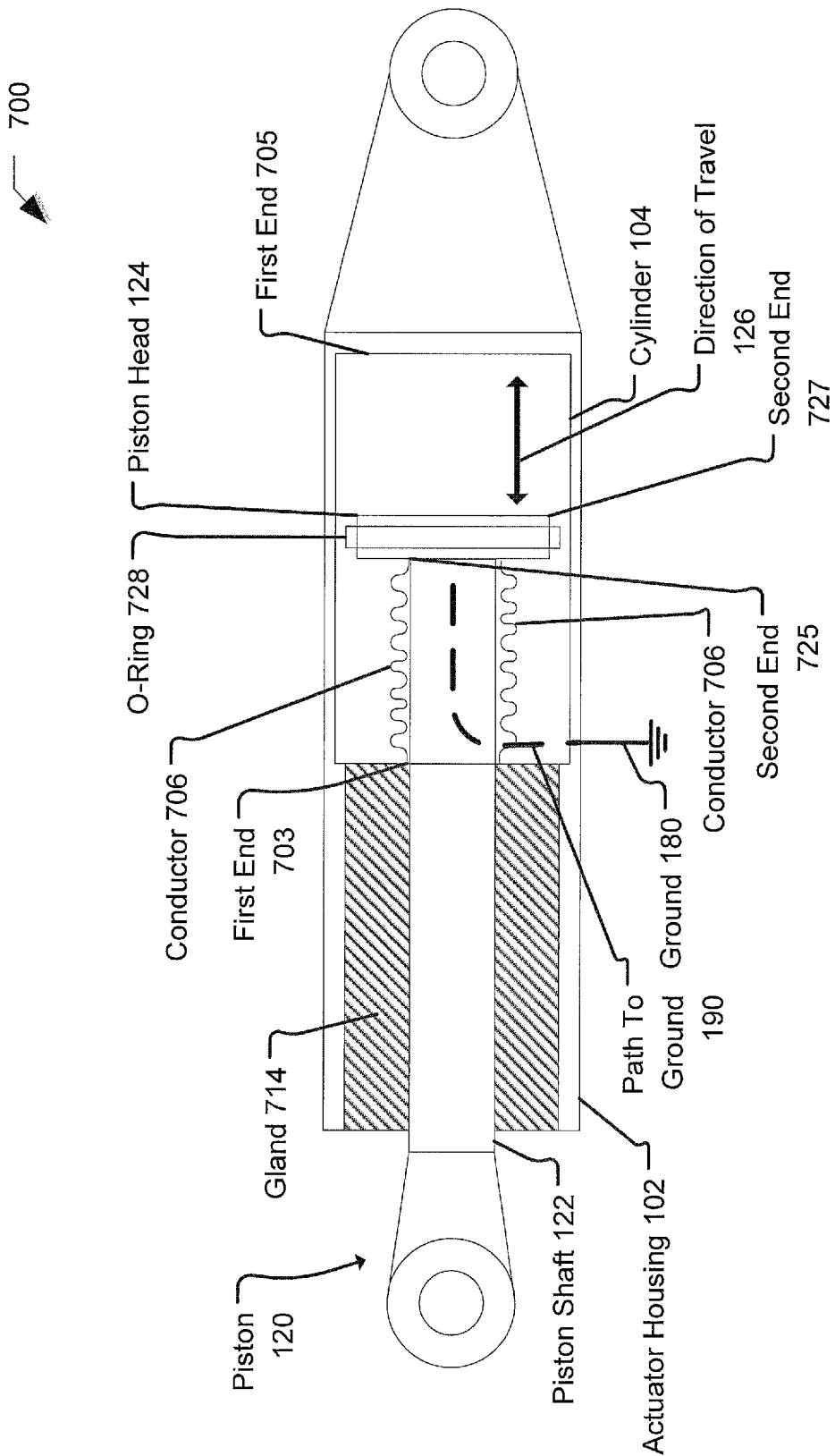
FIG. 7A is a cross-sectional view of another example of an actuator with internal features that provide a conductive path.
Figure 7B:
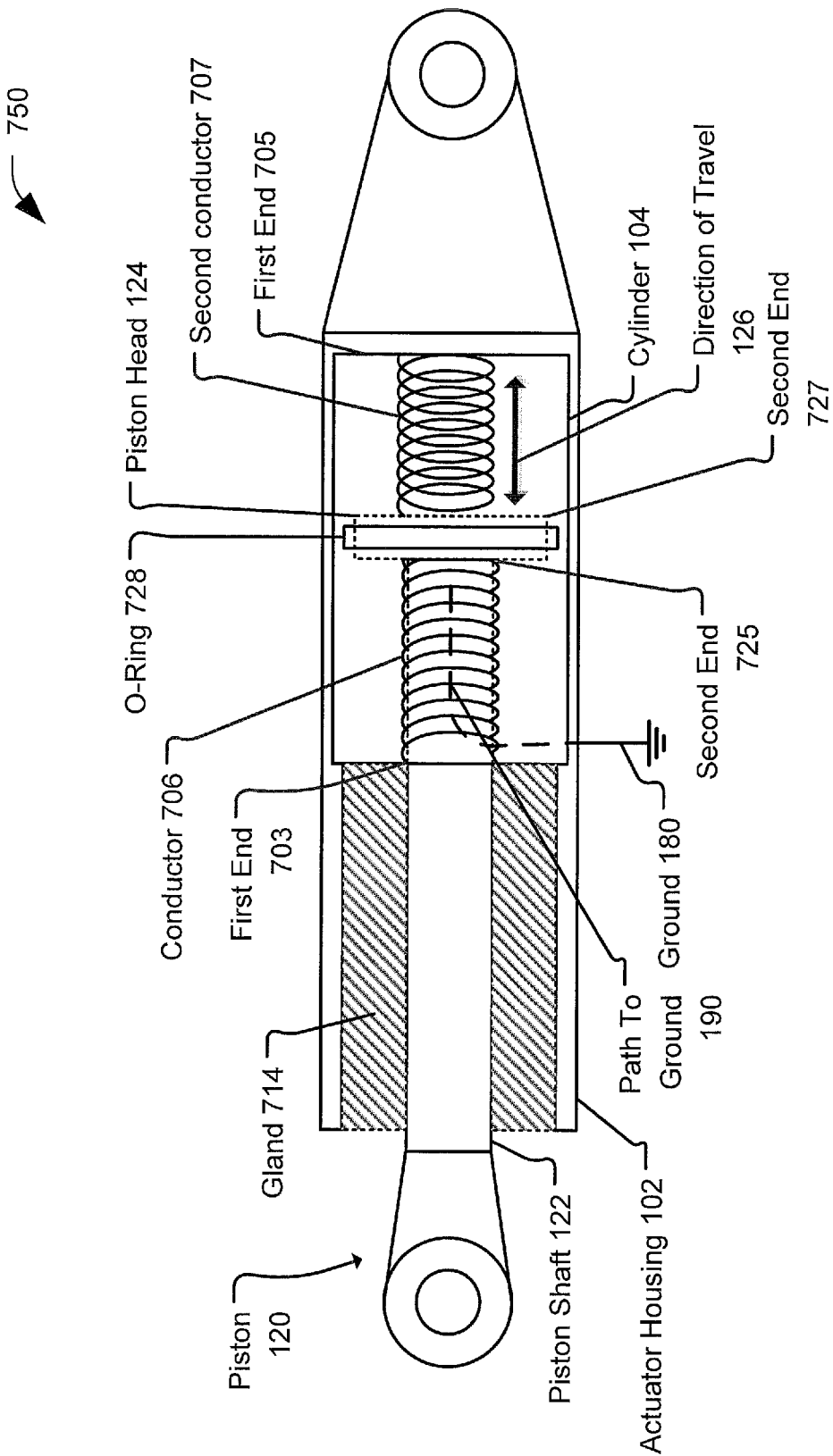
FIG. 7B is a cross-sectional view of another example of an actuator with internal features that provide a conductive path.

FIGS. 7A and 7B are cross-sectional views of additional examples of an actuator 700 and 750 with multiple internal features that provide a conductive path (e.g., a path to ground 190). In some implementations, the actuator 700 and 750 of FIGS. 7A and 7B includes the actuator housing 102, the cylinder 104, the piston 120, the piston shaft 122, the piston head 124, and the path to ground 190 of FIG. 1. The actuator 700 and 750 further includes a gland 714 and a conductor 706.

The gland 714 may correspond to the gland 114 of FIG. 1. The gland 714 may be electrically coupled to the actuator housing 102. For example, the gland 714 may be in direct physical contact with the actuator housing 102 to provide the conductive path between the gland 714 and the actuator housing 102. The gland 714 may be configured to seal the cylinder 104 to inhibit movement of a pressurized working fluid (e.g., hydraulic fluid) past an interface between the actuator housing 102 and the cylinder 104. The gland 714 may include a primary seal, a secondary seal, a buffer seal, bearing elements, wiper/scraper and a static seal, or a combination thereof, as illustrative, non-limiting examples.

In the implementation illustrated in FIGS. 7A and 7B, the conductor 706 is positioned with the cylinder 104, rather than within the housing and external to the cylinder 104 as in FIGS. 1, 5 and 6. Additionally, whereas the conductors 106 and 606 of FIGS. 1, 5, and 6, respectively, maintain relatively stationary contact with the gland and sliding contact with the piston shaft, in FIGS. 7A and 7B, the conductor 706 has a first end 703 coupled to or in contact with the gland 714 and a second end 725 coupled to or in contact with the piston shaft 122 or a first side of the piston head 124. For example, the first end 703 of the conductor 706 may be connected to the gland 714 using a fastener or using a metal joining technique (such as welding, soldering or brazing). Likewise, the second end 725 of the conductor 706 may be connected to the piston head 124 using a fastener or using a metal joining technique (such as welding, soldering or brazing). In the example illustrated in FIG. 7A, the conductor 706 may be a conductive bellow In this example, tension of the conductor 706 may maintain the conductor 706 in contact with one or both of the gland 714 and the piston head 124 throughout a range of motion of the piston head 124. In the example illustrated in FIG. 7B, the conductor 706 is coiled to form a spring. In this example, spring tension of the conductor 706 may maintain the conductor 706 in contact with one or both of the gland 714 and the piston head 124 throughout a range of motion of the piston head 124.

In the implementation illustrated in FIG. 7B, a second conductor 707 is also positioned with the cylinder 104. For example, the piston head 124 may include an O-ring 728 that form a seal with the wall of the cylinder 104 to divide the cylinder 104 into two chambers. In this example, the conductor 706 may positioned within a first chamber and the second conductor 707 may be positioned with a second chamber. The second conductor 707 has a first end 705 coupled to or in contact with an interior wall of the cylinder 104 (e.g., a portion of the actuator housing 102) and a second end 727 coupled to or in contact with a second side of the piston head 124. For example, the first end 705 of the second conductor 707 may be connected to the interior wall of the cylinder 104 using a fastener or using a metal joining technique (such as welding, soldering or brazing). Likewise, the second end 727 of the second conductor 707 may be connected to the piston head 124 using a fastener or using a metal joining technique (such as welding, soldering or brazing). As another example, the second conductor 707 may be coiled to form a spring, as illustrated in FIG. 7B. In this example, spring tension of the second conductor 707 may maintain the second conductor 707 in contact with one or both of the interior wall of the cylinder 104 and the piston head 124 throughout a range of motion of the piston head 124.

Since the conductor 706 may coil around the piston shaft 122, the piston shaft 122 acts as a retaining assembly to keep the conductor 706 in a desired orientation. However, since no shaft is present on the side of the cylinder 104 that includes the second conductor 707, the second conductor 707 may be retained in a desired orientation by fixing both ends 705, 727 or by sizing coils of the second conductor 707 to just fit within the cylinder 104 (e.g. to contact or nearly contact the walls of the cylinder 104).

Although FIG. 7B illustrates an implementation that includes two conductors 706, 707, in other implementations, only one of the conductors 706, 707 may be present. For example, the actuator 700 may include the conductor 706 without the second conductor 707. Alternatively, the actuator 700 may include the second conductor 707 without the conductor 706.

Thus, the conductor 706, the second conductor 707, or both, may provide a current path between the piston 120 and the actuator housing 102, such as the path to ground 190 from the piston shaft 122 to the actuator housing 102. The conductor 706, the second conductor 707, or both, may expand and contract as the piston shaft 122 reciprocates within the actuator housing 102. For example, in an implementation that includes the conductor 706, at least a portion of the conductor 706 remains in electrical contact with the piston 120 (e.g., the second end 725 of the conductor 706 remains in contact with the first side of the piston head 124) and at least a portion of the conductor 706 remains in electrical contact with the actuator housing 102 (e.g., the first end 703 of the conductor 706 remains in contact with the gland 714 which is in contact with actuator housing 102) while the piston 120 reciprocates within the actuator housing 102. As another example, in an implementation that includes the second conductor 707, at least a portion of the second conductor 707 remains in electrical contact with the piston 120 (e.g., the second end 727 of the second conductor 707 remains in contact with the second side of the piston head 124) and at least a portion of the second conductor 707 remains in electrical contact with the actuator housing 102 (e.g., the first end 705 of the second conductor 707 remains in contact with the interior wall of the cylinder) while the piston 120 reciprocates within the actuator housing 102. Thus, while the piston shaft 122 moves relative to the actuator housing 102, the conductor 706 maintains contact with both the piston shaft 122 and the actuator housing 102 to provide the electric conduction path.

Figure 8:
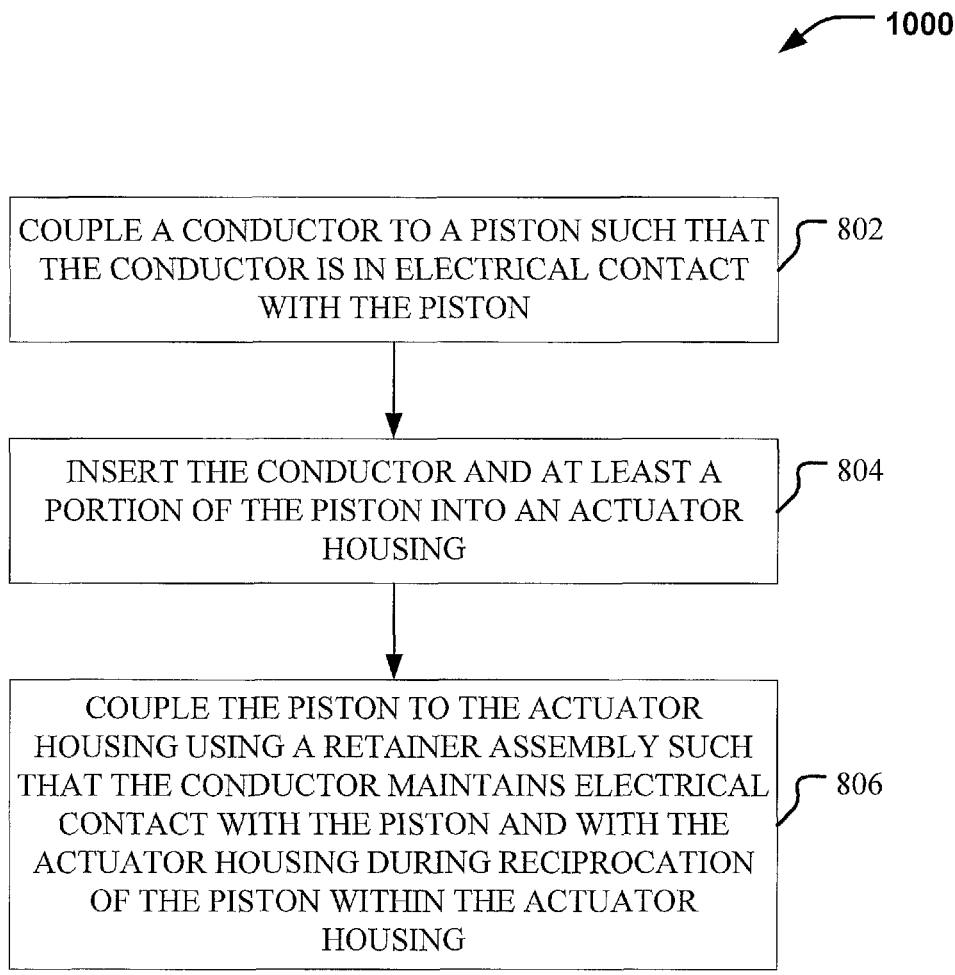
FIG. 8 is a flow chart of an illustrative example of a method of assembling an actuator.

FIG. 8 is a flow chart of an illustrative example of a method 800 of assembling an actuator. The method 800 enables assembly of an actuator that includes internal features that provide a conductive path between a piston shaft of the actuator and an actuator housing of the actuator. For example, the actuator assembled using the method 800 may correspond to the actuator 100 of FIG. 1, the actuator 500 of FIG. 5, the actuator 600 of FIGS. 6A and 6B, the actuator 700 of FIG. 7A, or the actuator 750 of FIG. 7B.

The method 800 includes, at 802, coupling a conductor to a piston such that the conductor is in electrical contact with the piston. For example, the conductor 106 of FIGS. 1 and 5 or the conductor 606 of FIG. 6 may be coupled to the piston shaft 122 by extending the piston shaft 122 through an opening of the conductor. The conductor may have a split ring configuration, such as the split ring conductor 300 of FIG. 3 or the split ring finger conductor 400 of FIG. 4. The split ring may define an opening that has a diameter that is less than a diameter of the piston shaft. Accordingly, when the conductor is coupled to the piston shaft, the conductor may remain in contact with the piston shaft while sliding along the piston shaft as the piston reciprocates within the actuator housing.

In another example, the conductor may include the conductor 706 or the second conductor 707 of FIG. 7B. In this example, the conductor may be coupled to a piston head of the piston. To illustrate, the second end 725 of the conductor 706 may be coupled to the first side of the piston head 124 (e.g., using a fastener, a metal joining process, spring force, or another coupling process). As another illustration, the second end 727 of the second conductor 707 may be coupled to the second side of the piston head 124 (e.g., using a fastener, a metal joining process, spring force, or another coupling process).

In addition to the conductor, the method 800 may include coupling other components to the piston shaft. For example, during assembly of the actuator 100 of FIG. 1, the gland 114, the guide 108, the spring element 112, and the retainer 110 may also be coupled to the piston 120. To illustrate, each of the retainer 110, the spring element 112, the guide 108, the conductor 106, and the gland 114 may be coupled to the piston shaft 122, and subsequently, the piston head 124 may be coupled to the piston shaft (e.g., using threading of the piston shaft 122 and the piston head, using a metal joining technique, or using a fastener). As another example, during assembly of the actuator 500 of FIG. 5, the retainer 510, the spring element 112, the guide 108, the conductor 106, and the gland 114 may be coupled to the piston shaft 122, and subsequently, the piston head 124 may be coupled to the piston shaft 122 (e.g., using threading of the piston shaft 122 and the piston head, using a metal joining technique, or using a fastener). As yet another example, during assembly of the actuator 600 of FIG. 6A, the retainer 110, the conductor 606 and the gland 114 may be coupled to the piston shaft 122, and subsequently, the piston head 124 may be coupled to the piston shaft 122 (e.g., using threading of the piston shaft 122 and the piston head, using a metal joining technique, or using a fastener). As still another example, during assembly of the actuator 700 or actuator 750 of FIGS. 7A and 7B, the gland 714 and the conductor 706 may be coupled to the piston shaft 122, and subsequently, the piston head 124 may be coupled to the piston shaft 122 (e.g., using threading of the piston shaft 122 and the piston head, using a metal joining technique, or using a fastener). Additionally, or in the alternative, during assembly of the actuator 700 or the actuator 750 of FIGS. 7A and 7B, the gland 714 may be coupled to the piston shaft 122, the second conductor 707 may be coupled to the piston head 124, and the piston head 124 may be coupled to the piston shaft 122 (e.g., using threading of the piston shaft 122 and the piston head, using a metal joining technique, or using a fastener).

The method 800 may further include, at 804, inserting the conductor and at least a portion of the piston into an actuator housing. For example, during assembly of the actuator 100 of FIG. 1, the piston head 124, the gland 114, the conductor 106, the guide 108, the spring element 112, the retainer 110, and at least a portion of the piston shaft 122 may be inserted into the actuator housing 102. As another example, during assembly of the actuator 500 of FIG. 5, the piston head 124, the gland 114, the conductor 106, the guide 108, the spring element 112, the retainer 510, and at least a portion of the piston shaft 122 may be inserted into the actuator housing 102. As yet another example, during assembly of the actuator 600 of FIG. 6A, the piston head 124, the gland 114, the conductor 606, the retainer 110, and at least a portion of the piston shaft 122 may be inserted into the actuator housing 102. As still another example, during assembly of the actuator 700 or the actuator 750 of FIGS. 7A and 7B, the piston head 124, the gland 714, at least one of the conductor 706 or the second conductor 707, and at least a portion of the piston shaft 122 may be inserted into the actuator housing 102.

The method 800 may include, at 806, coupling the piston to the actuator housing using a retainer assembly such that the conductor maintains electrical contact with the piston and with the actuator housing during reciprocation of the piston within the actuator housing. For example, during assembly of the actuator 100 of FIG. 1, the gland 114 may be coupled to the actuator housing 102, and a retaining assembly (e.g., the retainer 110, the spring element 112, and the guide 108) may be coupled to the gland 114 to retain the conductor 106 in electrical contact with the actuator housing 102 and with the piston 120. As another example, during assembly of the actuator 500 of FIG. 5, the gland 114 may be coupled to the actuator housing 102, and a retaining assembly (e.g., the retainer 510, the spring element 112, and the guide 108) may be coupled to the gland 114 to retain the conductor 106 in electrical contact with the actuator housing 102 and with the piston 120. As yet another example, during assembly of the actuator 600 of FIG. 6A, the gland 114 may be coupled to the actuator housing 102, and a retaining assembly (e.g., the retainer 110) may be coupled to the gland 114 to retain the conductor 606 in electrical contact with the actuator housing 102 and with the piston 120. As still another example, during assembly of the actuator 700 or the actuator 750 of FIGS. 7A and 7B, the piston shaft 122 or interior walls of the cylinder 104 may act as a retaining assembly to retain the conductor 706, the second conductor 707, or both, in a desired orientation such that the conductor 706, the second conductor 707, or both remain in electrical contact with the actuator housing 102 and with the piston 120.

Figure 9:
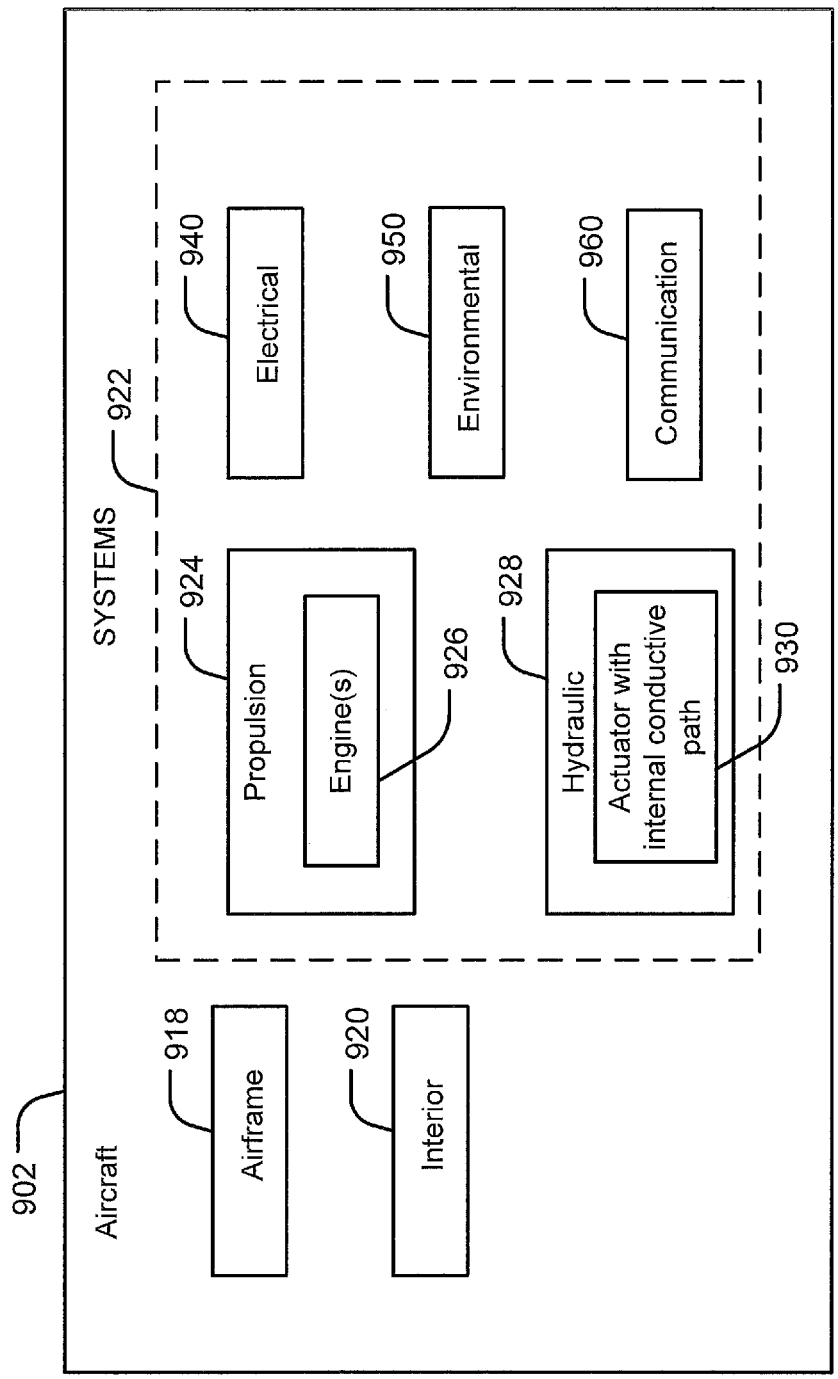
FIG. 9 is a block diagram of an illustrative embodiment of an aircraft that includes an actuator with a flight management system.

FIG. 9, a block diagram of an illustrative embodiment of an aircraft 902 that includes an actuator 930 that includes internal features that provide a conductive path between a piston shaft of the actuator and an actuator housing of the actuator. As shown in FIG. 9, the aircraft 902 may include an airframe 918, an interior 920, and a plurality of systems 922. The systems 922 may include, as illustrative examples, a propulsion system 924 including one or more engine 926, a hydraulic system 928 including the actuator 930, an electrical system 940, an environmental system 950, and a communication system 960.

In a particular implementation, the airframe 918 may include or be formed at least partially of a composite material. In this implementation, the airframe 918 or portions of the airframe 918 may be non-conductive. When the actuator 930 is coupled to a non-conductive portion of the airframe 918, such as a flight control surface, the airframe 918 may not provide a conductive path between the piston and the actuator housing of the actuator 930. However, the internal features of the actuator 930 may provide a conductive path between the piston and the actuator housing of the actuator 930. For example, the actuator 930 may correspond to or include one or more of the actuator 100 of FIG. 1, the actuator 500 of FIG. 5, the actuator 600 of FIGS. 6A and 6B, the actuator 700 of FIG. 7A, or the actuator 750 of FIG. 7B. In each of these examples, the conductive path may prevent uneven buildup of charge between the piston and the actuator housing. Additionally, the conductive path may provide a path to ground to enable dissipation of current due to events, such as a lightning strike. Although FIG. 9 specifically illustrates an aerospace application of the actuator 930, in other implementations, the actuator 930 may be used in another application, such as, as a component of a land-based vehicle (e.g., an automobile or train), as a component of a water-based vehicle (e.g., a ship or submarine), as a component of a space craft, as a component of a structure (e.g., a building, an oil platform, etc.), or as a component of a construction equipment or lifting equipment device (e.g., a crane, a lift truck, etc.).

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method steps may be performed in a different order than shown in the figures or one or more method steps may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. As the following claims reflect, the claimed subject matter may be directed to less than all of the features of any of the disclosed examples.

Examples described above illustrate but do not limit the disclosure. It should also be understood that numerous modifications and variations are possible in accordance with the principles of the present disclosure. Accordingly, the scope of the disclosure is defined by the following claims and their equivalents.

What is claimed is:

1. An actuator comprising:
    a piston including a piston shaft;
    a housing, wherein the piston is configured to reciprocate within a chamber of the housing;
    a gland electrically coupled to the housing and surrounding the piston shaft;
    a conductor that at least partially encircles the piston shaft, the conductor electrically coupled to the piston and the gland to electrically couple the piston to the housing via the gland as the piston reciprocates within the chamber, wherein the conductor comprises a plurality of spring fingers arranged in a ring around the piston shaft; and
    a retainer coupled to the gland and surrounding the piston shaft, the retainer configured to retain the conductor in electrical contact with the gland.

2. The actuator of claim 1, further comprising a spring element surrounding the piston shaft and positioned between the conductor and a first end of the retainer.

3. The actuator of claim 2, further comprising a guide surrounding the piston shaft and positioned between the spring element and the conductor.

4. The actuator of claim 2, wherein the spring element comprises an elastomer.

5. The actuator of claim 1, wherein surfaces of at least a portion of the plurality of spring fingers are configured to contact the piston shaft.

6. The actuator of claim 1, wherein female threading of the gland couples to male threading of the retainer to connect the gland to the retainer.

7. The actuator of claim 1, wherein a first portion of the gland is configured to form a seal with the chamber of the housing to inhibit movement of a fluid from the chamber.

8. The actuator of claim 1, wherein the gland includes male threading to connect to female threading of the housing.

9. The actuator of claim 1, wherein the gland includes male threading to connect to female threading of the retainer.

10. An actuator comprising:
   a piston including a piston shaft;
   a housing, wherein the piston is configured to reciprocate within a chamber of the housing;
   a gland electrically coupled to the housing and surrounding the piston shaft;
   a conductor that at least partially encircles the piston shaft, the conductor electrically is coupled to the piston and the gland to electrically couple the piston to the housing via the gland as the piston reciprocates within the chamber, wherein the conductor comprises a split ring arranged around the piston shaft; and
   a retainer coupled to the gland and surrounding the piston shaft, the retainer configured to retain the conductor in contact with the gland.

11. The actuator of claim 10, further comprising a spring element surrounding the piston shaft and positioned between the conductor and a first end of the retainer.

12. The actuator of claim 11, further comprising a guide surrounding the piston shaft and positioned between the spring element and the conductor.

13. The actuator of claim 10, wherein the split ring maintains sliding contact with the piston shaft during reciprocation of the piston in the chamber.

14. The actuator of claim 10, wherein the split ring includes a curved body defining a first end and a second end, wherein a first elongated member extends outward from the first end and a second elongated member extends outward from the second end.

15. The actuator of claim 10, wherein the split ring includes a curved body defining a first end and a second end, the first end and the second end separated by a gap of the split ring, wherein a wall thickness of the split ring tapers toward the first end and the second end.

16. The actuator of claim 10, wherein a first portion of the gland is configured to form a seal with the chamber of the housing to inhibit movement of a fluid from the chamber.

17. A method comprising:
   coupling a gland to an actuator housing, wherein the gland surrounds a piston shaft, and wherein a piston coupled to the piston shaft is positioned in a chamber of the actuator housing;
   coupling a conductor to the piston shaft such that the conductor at least partially encircles the piston shaft and is in electrical contact with the piston, wherein the conductor comprises a split ring; and
   attaching a retainer to the gland to electrically couple the conductor to the gland such that the conductor maintains electrical contact with the piston and with the actuator housing via the gland during reciprocation of the piston within the chamber of the actuator housing.

18. The method of claim 17, further comprising positioning a guide and a spring element around the piston shaft before attaching the retainer, the guide positioned between the spring element and the conductor.

19. The method of claim 17, wherein attaching the retainer to the gland comprises connecting male threading of the retainer to female threading of the gland.

20. The method of claim 17, wherein attaching the retainer to the gland comprises connecting female threading of the retainer to male threading of the gland.

* * * * *

UNITED STATES PATENT AND TRADEMARK OFFICE
CERTIFICATE OF CORRECTION

PATENT NO. : 10,458,443 B2  
APPLICATION NO. : 15/090314  
DATED : October 29, 2019  
INVENTOR(S) : Kevin S. Callahan, Christopher E. Plass and Matthew A. Moser Page 1 of 1

It is certified that error appears in the above-identified patent and that said Letters Patent is hereby corrected as shown below:

In the Claims

Column 15, Line 19, Claim 10, after "conductor electrically" delete "is".

Signed and Sealed this
Twenty-first Day of January, 2020

Andrei Iancu
*Director of the United States Patent and Trademark Office*